(12) United States Patent
Zhang et al.

(10) Patent No.: US 9,449,049 B2
(45) Date of Patent: Sep. 20, 2016

(54) RETURNING ESTIMATED VALUE OF SEARCH KEYWORDS OF ENTIRE ACCOUNT

(75) Inventors: Tao Zhang, Hangzhou (CN); Jiaqing Guo, Hangzhou (CN); Ning Guo, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 80 days.

(21) Appl. No.: 13/318,335

(22) PCT Filed: Aug. 4, 2011

(86) PCT No.: PCT/US2011/046584
§ 371 (c)(1),
(2), (4) Date: Oct. 31, 2011

(87) PCT Pub. No.: WO2012/019001
PCT Pub. Date: Feb. 9, 2012

(65) Prior Publication Data
US 2013/0254175 A1    Sep. 26, 2013

(30) Foreign Application Priority Data
Aug. 4, 2010   (CN) .......................... 2010 1 0247942

(51) Int. Cl.
G06F 7/00        (2006.01)
G06F 17/30      (2006.01)
G06Q 30/02     (2012.01)

(52) U.S. Cl.
CPC ........... *G06F 17/3053* (2013.01); *G06Q 30/02* (2013.01); *G06Q 30/0247* (2013.01); *G06Q 30/0254* (2013.01); *G06Q 30/0273* (2013.01);

(Continued)

(58) Field of Classification Search
None
See application file for complete search history.

(56) References Cited

U.S. PATENT DOCUMENTS

| | | | |
|---|---|---|---|
| 8,224,689 B1 * | 7/2012 | Sandberg et al. ............ | 705/7.35 |
| 8,572,011 B1 * | 10/2013 | Sculley, II ..................... | 706/13 |
| 2004/0133469 A1 * | 7/2004 | Chang ............................ | 705/14 |

(Continued)

FOREIGN PATENT DOCUMENTS

WO    WO 2010030116 A2 *   3/2010   ............ G06Q 30/00

OTHER PUBLICATIONS

Machine Translation from WIPO of Publication WO2010030116 Method for Auctioning and Billing for Search Advertisement, System, and Computer-Readable Recording Medium.*

(Continued)

*Primary Examiner* — Jason Liao
*Assistant Examiner* — David T Brooks

(57) ABSTRACT

Techniques for returning estimated value of search keywords of an entire account include, for the entire account, obtaining one or more selected search keywords and their respective forecast periods and parameter settings. An estimated value of a respective search keyword in the respective forecast period is forecasted. Based on stored historical data and parameter settings of the respective search keyword, the estimated value of the respective search keyword is modified to obtain a modified estimated value. The modified estimated value of each search keyword is added up to generate an estimated value of the entire account. The estimated value of the entire account is returned to a client terminal from which the entire account is logged in. The present disclosure modifies the respective search keyword's estimated value so that the estimated value of the entire account satisfies the expected value of the client.

16 Claims, 7 Drawing Sheets

(52) U.S. Cl.
CPC ...... *G06Q 30/0275* (2013.01); *G06Q 30/0283* (2013.01)

(56) References Cited

U.S. PATENT DOCUMENTS

| | | | |
|---|---|---|---|
| 2006/0010105 A1* | 1/2006 | Sarukkai et al. | 707/3 |
| 2006/0206355 A1* | 9/2006 | Cheung et al. | 705/1 |
| 2006/0206479 A1 | 9/2006 | Mason | |
| 2006/0248035 A1 | 11/2006 | Gendler et al. | |
| 2007/0255690 A1 | 11/2007 | Chang et al. | |
| 2008/0033810 A1 | 2/2008 | Chu | |
| 2008/0052278 A1* | 2/2008 | Zlotin et al. | 707/3 |
| 2008/0103892 A1* | 5/2008 | Chatwin et al. | 705/14 |
| 2008/0255922 A1* | 10/2008 | Feldman et al. | 705/10 |
| 2008/0256061 A1* | 10/2008 | Chang et al. | 707/5 |
| 2009/0006045 A1* | 1/2009 | Liu et al. | 703/2 |
| 2009/0049029 A1 | 2/2009 | Choi et al. | |
| 2009/0070194 A1 | 3/2009 | Song | |
| 2009/0299831 A1* | 12/2009 | Li et al. | 705/14.1 |
| 2009/0299855 A1* | 12/2009 | Li et al. | 705/14.54 |
| 2009/0327030 A1* | 12/2009 | Collins | 705/10 |
| 2009/0327163 A1* | 12/2009 | Swan et al. | 705/400 |
| 2010/0049695 A2* | 2/2010 | Morsa | 707/3 |
| 2010/0161613 A1 | 6/2010 | Rao | |
| 2010/0306051 A1 | 12/2010 | Lee et al. | |
| 2011/0035259 A1 | 2/2011 | Das et al. | |
| 2011/0035276 A1* | 2/2011 | Ghosh et al. | 705/14.46 |
| 2011/0055229 A1 | 3/2011 | Kumar | |
| 2011/0106642 A1* | 5/2011 | Hassan et al. | 705/26.3 |
| 2011/0191169 A1* | 8/2011 | Cui et al. | 705/14.46 |
| 2011/0196736 A1 | 8/2011 | Pavagada et al. | |
| 2011/0251901 A1* | 10/2011 | Kwon et al. | 705/14.71 |
| 2012/0253945 A1* | 10/2012 | Gao | G06Q 30/2075 705/14.71 |

OTHER PUBLICATIONS

PCT Search Report and written opinion mailed Dec. 16, 2011 for PCT application No. PCT/US11/46584, 9 pages.

Chinese Office Action mailed Aug. 8, 2013 for Chinese patent application No. 201010247942.1 a counterpart foreign application of U.S. Appl. No. 13/318,335, 18 pages.

Extended European Search Report mailed Mar. 12, 2014 for European Patent Application No. 11815318.8, 5 pages.

* cited by examiner

RETURNING ESTIMATED VALUE OF SEARCH KEYWORDS OF ENTIRE ACCOUNT

CROSS REFERENCE TO RELATED PATENT APPLICATIONS

The present application is a national stage application of an International Patent Application No. PCT/US11/46584, filed Aug. 4, 2011, entitled "Returning Estimated Value of Search Keywords of Entire Account," which claims priority from Chinese Patent Application No. 201010247942.1, filed on Aug. 4, 2010, entitled "METHOD AND DEVICE FOR RETURNING ESTIMATED VALUE OF SEARCH KEYWORDS OF ENTIRE ACCOUNT," which applications are hereby incorporated by reference in their entireties.

TECHNICAL FIELD

The present disclosure relates to a field of search engine server technology, more specifically, to returning estimated values of search keywords of an entire account.

BACKGROUND

In operation of a search engine, the search engine provides a client terminal of a client with several search keywords that are used in placing advertisements. The client terminal usually has a certain amount of resources or data, referred to as "occupied resources," such as data transfer bandwidth, data transmission priority, and data transmission quality of service (QOS), and etc., or other data and capital resources that are valuable to the search engine. After the client has transmitted the certain resources or data to the search engine through the client terminal, the client may obtain several chosen search keywords. With respect to each search keyword, based on the differences in amount of the occupied resources provided by the client, a client's advertisement matching the search keyword can be placed on a corresponding location of a web page. When the client selects several search keywords, the amount of all of the occupied resources provided by the client is recorded in a data file stored in a database. The data file may be referred to as an entire account. The amount of the client's occupied resources can be reflected through the entire account, and based on the historical data of the client's occupied resources, the estimated cost and earning of the client's entire account can be forecasted. Here, the cost refers to the occupied resources provided by the client to choose the search keywords, and the earning refers to a number of clicks, a number of feedbacks, a number of closed transactions and other things that the client gains through the placed advertisements based on the chosen search keywords.

When forecasting the estimated costs and earnings, the current techniques add the estimated cost and earning of each keyword chosen by the client to obtain the estimated cost and earning of the client's entire account. For example, one client chooses search keywords a and b, then provides the occupied resources to each search keyword as p1 and p2. If the estimated earning and estimated cost of the search keyword a at the owned-resource p1 is v1 and c1 respectively, and the estimated earning and estimated cost of the search keyword b at the owned-resource p2 is v2 and c2 respectively, then the estimated earning of the client's entire account is v1+v2, and the estimated cost of the client's entire account is c1+c2.

The current forecasting methods for the estimated value relies only on accumulation of each search keyword's estimated value to obtain the estimated value of the entire account, thus there is often a big difference between the estimated value and the client's expected value. The most common difference is that the estimated cost is higher than the upper limit of the client's expected cost. When the search engine server returns to the client the estimated cost whose value is higher than the upper limit, the client removes one or more search keywords based on the estimated value, and then returns the selection result to the search engine server. This creates additional steps for the client, thereby decreasing the client experience. In addition, based on the client's returned result, the search engine server needs to re-estimate the estimated values of the search keywords in the client's entire account and return the result to the client. This consumes excess network resources due to the many communications between the search engine server and the client. Since the search engine server needs to perform multiple estimated value forecasts in order to meet the client's requirements, it also increases the workload of the search engine server.

SUMMARY

The exemplary embodiments of the present disclosure provide for returning an estimated value of search keywords of an entire account without consuming excess network resources due to inaccurate estimated values and without increasing the workload of the server.

According to one implementation, a generation of the estimated values of search keywords is based on the entire account. There are many different ways to generate the estimated values.

In one embodiment, within the entire account, multiple selected search keywords and their respective forecast periods and parameter settings are obtained. An estimated value of each search keyword in the respective forecast period is forecasted. Based on stored historical data and parameter settings of each search keyword, the estimated value of the respective search keyword is modified to obtain a modified estimated value. The modified estimated value of each search keyword is added up to generate an estimated value of the entire account. The estimated value of the entire account is returned to a client terminal from which the entire account is logged in.

In another embodiment, a search engine server may include a retrieval module, an estimation module, a modification module, a generation module, and a returning module. The modules may be performed programmatically, for example, in software and/or hardware. For example, each module may perform following operations.

The retrieval module, within the entire account, obtains multiple selected search keywords and their respective forecast periods, and parameter settings.

The estimation module estimates an estimated value of each search keyword in the respective forecast period.

The modification module, based on the stored historical data and parameter settings of each search keyword, modifies the estimated value of the respective search keyword to obtain a modified estimated value.

The generation module adds the modified estimated value of each search keyword to generate an estimated value of the entire account.

The returning module returns the estimated value of the entire account to a client terminal from which the entire account is logged in.

Accordingly, the search engine server, as disclosed in the exemplary embodiments of the present disclosure, obtains, within the entire account, multiple selected search keywords and their respective forecast periods, and parameter settings and estimates an estimated value of each search keyword in the respective forecast period. The search engine server, based on the stored historical data and parameter settings of each search keyword, modifies the estimated value of the respective search keyword to obtain a modified estimated value and adds the modified estimated value of each search keyword to generate an estimated value of the entire account. In addition, the search engine server also returns the estimated value of the entire account to the client terminal from which the entire account is logged in.

The methods in the exemplary embodiments of the present disclosure are different from the present techniques, which simply accumulate the estimated values of the search keywords in order to obtain the entire account's estimated value. The exemplary embodiments of the present disclosure, by taking into consideration the historical data and the client's parameter settings, modify each search keyword's estimated value so that the estimated value of the entire account satisfies the expected value of the client. When the search engine server returns the estimated value to the client, due to the higher accuracy of this estimated value, there is no need for the client to further change or modify the data, thereby increasing the client experience. Therefore, there is no need for multiple communications and repeated calculations of the estimated value between the search engine server and the client, thereby saving network resources and the workload of the server.

BRIEF DESCRIPTION OF THE DRAWINGS

To better illustrate embodiments of the present disclosure or techniques of the current technologies, the following is a brief introduction of FIGs to be used in descriptions of the embodiments. It is apparent that the following FIGs only relate to some embodiments of the present disclosure. A person of ordinary skill in the art can obtain other FIG.s according to the FIGs in the present disclosure without creative efforts.

DETAILED DESCRIPTION

The exemplary embodiments of the present disclosure provide techniques for returning estimated value of search keywords of an entire account. The present disclosure, by reference to the figures, clearly and fully describes the techniques.

Figure 1:
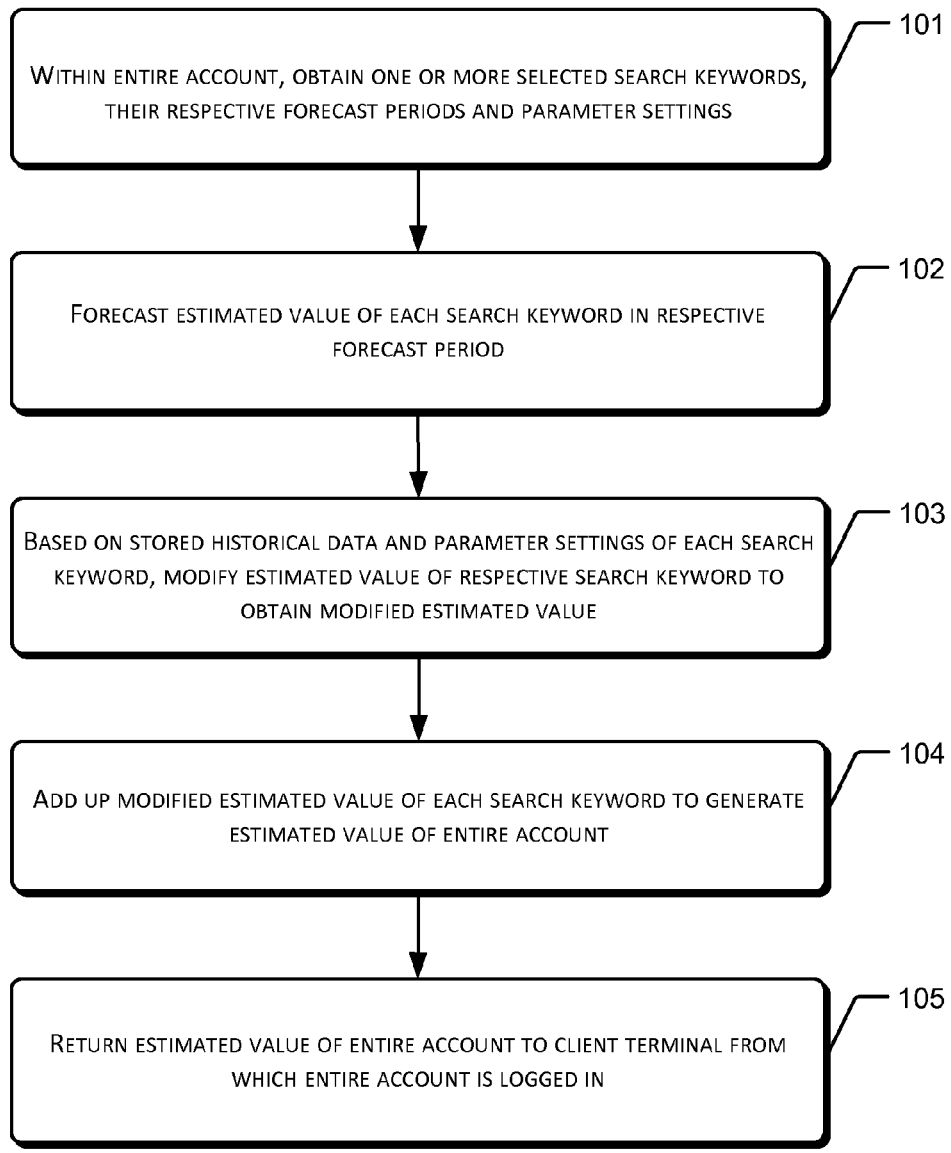
FIG. 1 illustrates a flow diagram of a first exemplary embodiment of a method for returning estimated value of search keywords of an entire account in accordance with the present disclosure.

FIG. 1 illustrates a flow diagram of a first exemplary embodiment of a method for returning an estimated value of search keywords of an entire account in accordance with the present disclosure.

At 101, multiple selected search keywords, respective forecast periods, and parameter settings are obtained from within an entire account. The multiple search keywords are selected for the entire account.

A client who utilizes the web page provided by the search engine server to place their advertisements will register an account at the website associated with the search engine server. The website provides multiple search keywords that are used to place advertisements to the client. Each client can choose the needed search keywords. When the client selects several search keywords, such client is deemed as having an entire account including the selected search keywords. There is a need to forecast the estimated cost and estimated earning of the client's entire account. Here, the cost refers to the occupied resources provided by the client to choose the search keywords, and the earning refers to a number of clicks, a number of feedbacks, a number of closed transactions and other things that the client gains through the placed advertisements based on the chosen search keywords. The search keywords selected by the client may be stored in a database, such as a data table, of the search engine server. Each entry in the data table sores an identification (ID) of the client's entire account and the selected search keywords. When the search keywords of the client's entire account need estimating, the ID of the client's entire account may be used to search the corresponding search keywords in the data table. In addition, the client may directly enter the search keywords into the search engine server.

The forecast period may be entered by the client, or be determined by the search engine server. The forecast period may be individually set for each search keyword, or may be the same for every search keyword. The forecast period is used to restrict the estimated consumption and the estimated earning of the client's selected search keywords to a given timeframe.

The parameter settings of each search keyword may include a bid price for each search keyword from the client's entire account, and the presentation time of each search keyword on the search page.

At 102, an estimated value of each search keyword in the forecast period is forecasted.

In forecasting the estimated value of each search keyword in the forecast period, current estimate calculation techniques methods may be used. For example, historical data of the search keyword from the same client or similar client may be used to forecast the search keyword's estimated earning and estimated cost in the forecast period. Here, "the same client" refers to the client and the client has selected these search keywords in a historical period. "The similar client" refers to another client who has selected the same search keywords as the current client in the historical period. The above-mentioned historical data are stored in the search engine server's database. The database may provide a historical data table for each client. Each entry in the historical data table may be used to store the client's selected search keywords in each respective period, as well as the actual earning and actual consumptions of the search keywords. For another example, by using the ranking position of the client's bid price on the search keyword among all clients' bid prices, the database may use an estimated earning and estimated cost corresponding to the ranking position as the estimated earning and estimated cost of the search keyword. The above are just two exemplary calculation methods. The present disclosure does not restrict the calculation methods used to forecast each search keyword's estimated value.

At 103, based on the stored historical data and parameter settings of each search keyword, the estimated value of the respective search keyword is modified to obtain a modified estimated value.

For a respective search keyword, if during the historical period prior to the forecast period there is one entire account that has already selected the search keyword (in other words, based on the historical statistics data), the estimated earning and the estimated consumption of the search keyword in the historical period may be obtained. Several time periods whose lengths are equal or similar to the presentation time period of the search keyword set by the client may be selected. These time periods may constitute the historical period. Based on the estimated earning and estimated consumption of the search keyword in each time period, a proportion of each time period's estimated earning and estimated cost in the historical period's total estimated earning and total estimated cost may be calculated. In other words, the distribution ratio of the historical estimated earnings and the distribution ratio of the historical estimated consumption of the search keyword in its presentation time period may be calculated based on the historical statistics data.

In the process of modification of the estimated earning, the forecasted estimated earning in 102 may be multiplied with each distribution ratio of the historical estimated earning, and all multiplication results may be added up to obtain the modified estimated earning. In the process of modifying the estimated earning, the forecasted estimated cost in 102 may be multiplied by each distribution ratio of the historical estimated cost, and all multiplication results may be added up to obtain the modified estimated cost.

After the estimated values have been modified through the historical data and the presentation time set up by the client as mentioned above, such modified estimated values may be further modified by using the estimated earning and estimated cost of the search keyword in a historical period whose length is similar to the forecast period's length. For an example of the estimated consumption, a consumption error threshold and a consumption compensation threshold may be set up. If the difference between the modified estimated cost and the historical period's estimated consumption is smaller than the consumption error threshold, there is no change to the modified estimated consumption. If the difference is bigger than the consumption error threshold, the historical period's estimated consumption may be added with the consumption compensation threshold, and as the sum may be used as the modified estimated consumption.

At 104, the modified estimated value of each search keyword is added up to generate the estimated value of the entire account.

The estimated earning of each search keyword is added up to obtain the estimated earning of the entire account, and the estimated cost of each search keyword is added up to obtain the estimated cost of the entire account. The calculation method in this operation is similar to the present techniques and is not detailed herein.

At 105, the estimated value of the entire account is returned to the client terminal where the entire account is logged in. This ends the current operations.

The above exemplary embodiment performs modification to each search keyword's estimated value so that the estimated value of the entire account may satisfy the client's forecasted value. When the search engine server returns the estimated values to the client, due to the higher accuracy of the estimated values, there is no need for further processing by the client, thereby improving the client experiences. In addition, there is no need for the search engine server and the client to have multiple communications and perform repeated calculations on the estimated values, thereby saving network resources and reducing the workload of the server.

Figure 2:
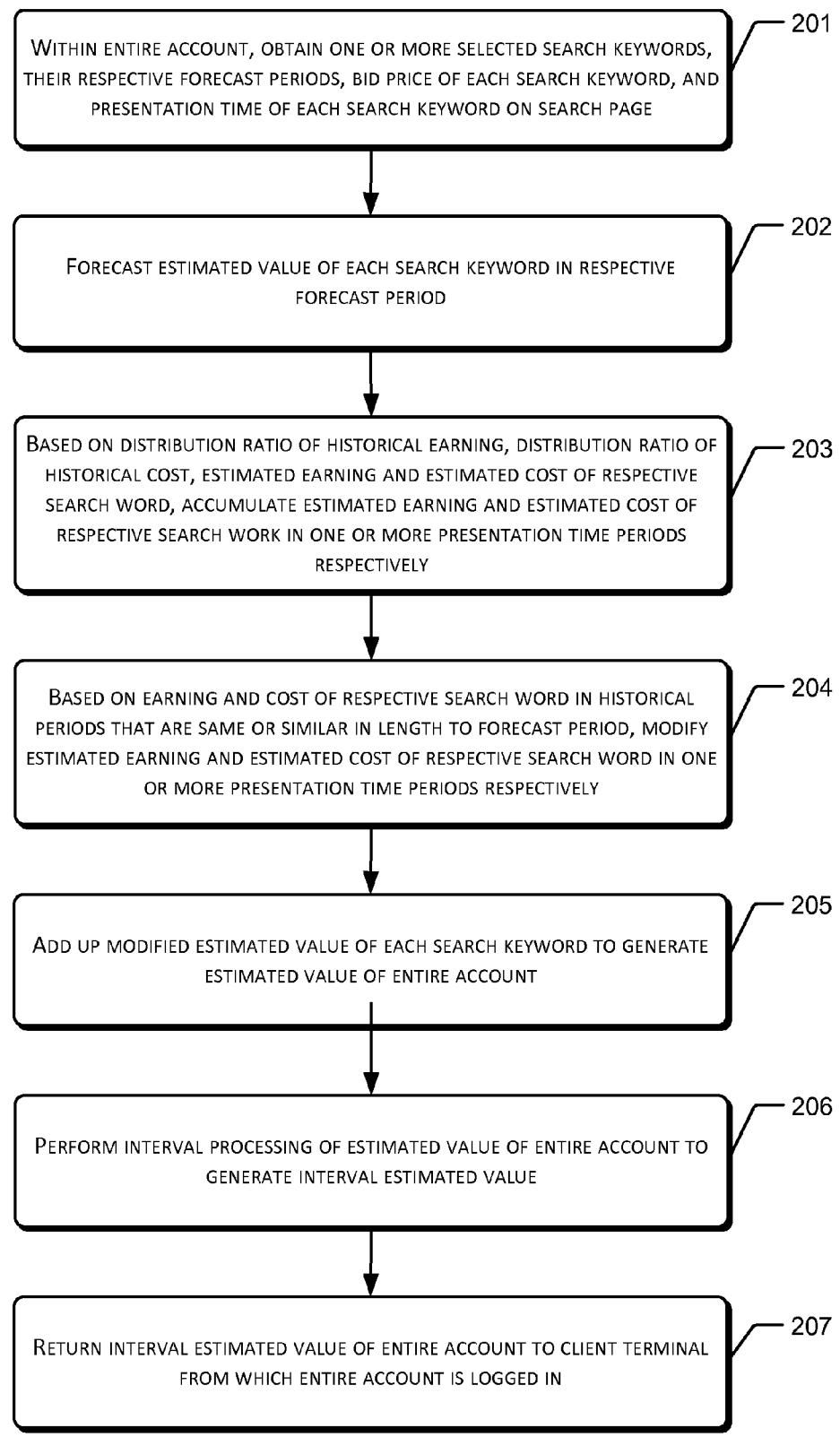
FIG. 2 illustrates a flow diagram of a second exemplary embodiment of a method for returning estimated value of search keywords of an entire account in accordance with the present disclosure.

FIG. 2 illustrates a flow diagram of a second exemplary embodiment of a method for returning estimated value of search keywords of an entire account in accordance with the present disclosure. The occupied resources in this exemplary embodiment refer to the capital provided by the client to the search engine server. This exemplary embodiment, by reference to FIG. 2, details the process flow of the method for returning the estimated values.

At 201, multiple selected search keywords, their respective forecast periods, a bid price of each search keyword, and a presentation time of each search keyword on the search page are obtained from within an entire account. The multiple search keywords are selected for the entire account.

The client who utilizes a web page provided by the search engine server to place their advertisements may use a website associated with the search engine server to register an account. The website provides several search keywords to the clients to place advertisements. Each client may choose the search keywords by the need. The search engine server may also provide a bid price range of each search keyword to the client.

The forecast period may be entered by the client, or be determined by the search engine server. The forecast period may be set individually for each search keyword, or may be set the same for every search keyword. The forecast period is used to restrict the estimated cost and the estimated earnings of the client's selected search keywords to within a specified timeframe.

The client's bid price for each search keyword may be within the bid price range of the respective search keyword provided by the web page. The presentation time refers to the client's desired length of time for the selected search keywords to appear on the web page. Further, the client may input the entire account's cost upper limit, which is used to modify succeeding forecasted estimated cost.

For example, the search engine server obtained a client's selected search keyword "mp3." The bid price for the search keyword is "$3," which is the cost value to be paid every time the search keyword is clicked. The search keyword's presentation time is "1 week," and the corresponding forecast period may also be set as "1 week."

At 202, an estimated value of each search keyword in the respective forecast period is forecasted.

In forecasting the estimated value of each search keyword in the forecast period, current estimate calculation techniques may be used and are not detailed herein. The present disclosure describes a forecasted estimated value calculation method below for example.

First of all, the search keyword's presentation volume in the forecast period, designated as pv, is forecasted based on the search keyword's historical presentation volume data. Based on statistics of the historical data, at least the following data may be obtained: the respective search keyword's click rate at each presentation location, designated as $ctr_i$ (representing the click rate at the ith presentation location), the respective search keyword's presentation ratio at each presentation location at a bid price, designated as $imp_i$, (representing the probable frequency ratio of presentation at the ith presentation location), the respective search keyword's cost of each click at each presentation location, designated as $cost_i$ (representing the cost of each click at the ith presentation location), and the respective search keyword's conversion rate from the number of clicks to the earning, designated as percent. Thus, the estimated earning and estimated cost of the client's one bid for the respective search keyword in one forecast period can be represented may be obtained according to the following formula.

$$\text{Estimated earning} = \sum_{i=1}^{n} pv \times ctr_i \times imp_i \times \text{percent}$$

(where n is a number of the presentation locations and n is a natural number)

$$\text{Estimated cost} = \sum_{i=1}^{n} pv \times ctr_i \times imp_i \times cost_i$$

(where n is the number of the presentation locations and n is a natural number)

At 203, based on a distribution ratio of the historical earning, a distribution ratio of historical cost, the estimated earning and estimated cost of the respective search word, the estimated earning and estimated cost of the respective search word are accumulated in one or more presentation time periods respectively.

The search keyword "mp3" is still used as an example here. The presentation time period set by the client is "1 week." Through statistics of the historical data of costs and values of "mp3" in the several historical "1 week" periods and based on the overall earnings and overall costs in the overall historical periods, the ratio of the earning and cost of each historical "1 week" to the overall earnings and overall costs may be obtained and designated as $profit\_ratio_i$ (the profit ratio at the ith historical presentation time period) and $cost\_ratio_i$ (the cost ratio at the ith historical presentation time period) respectively. The presentation time period allowed by the client may be certain weeks in a month. If, in the step 202, the estimated earning of "mp3" is profit, and the estimated cost of "mp3" is cost, the values of the estimated earning and the estimated cost may be modified as follows:

$$\text{Modified estimated earning value} = \sum_{i=1}^{n} \text{profit} \times \text{profit\_ratio}_i$$

$$\text{Modified estimated cost value} = \sum_{i=1}^{n} \text{profit} \times \text{cost\_ratio}_i$$

In the above formulas, n is a number of the selected historical presentation time periods, and is a natural number. The above formulas are based on the distribution ratios of estimated earning and estimated cost in the several historical presentation times that are same or similar in length to the presentation time period to modify the estimated earning and estimated cost of each search keyword. As used herein, similarity is evaluated based on a threshold (e.g., +/-a specified percentage of the respective value, such as, for example, +/-10%).

At 204, based on the earning and cost of the respective search word in the historical periods that are same or similar in length to the forecast period, the estimated earning and estimated cost of the respective search word in the one or more presentation time periods are corrected respectively. Such similarity is evaluated based on a threshold.

Further, the above modified estimated earning value and modified estimated cost value may be further corrected as follows:

$$\text{result} = \begin{cases} p & \text{if } fun(p, r) < \varepsilon \\ r + \delta & \text{if } fun(p, r) \geq \varepsilon \end{cases}$$

In the above formula, result is a corrected value after the calculation of the formula. p is the estimated earning value or estimated cost value that has undergone modification in the step 203, and r is the actual earning value and actual cost value of the search keyword "mp3," under a same or similar bid price that the client bids for the search keyword, in the historical period that is same or similar in length to the forecast period. If the client has not submitted any bid on "mp3," then the earning and cost of a similar client at the same or similar bid price in the historical period may be selected. The similar client refers to a client whose cost upper limit and the configured presentation time period are within the predefined error range of those of the client. If there is no record of the bid price for the respective search keyword in the historical period, then the modified result in step 203 may be directly selected as the corrected estimated value. Such similarity is evaluated based on a threshold.

In the above formula, $\delta$ is the compensation threshold of the estimated value. For example, when the estimated value is the estimated cost value, the $\delta$ may be preset as "1." fun is an error function. The error function may be an absolute error function, or a relative error function. For example, fun $(p, r) = |p-r|$, and $\varepsilon$ is a preset error threshold. The preset error threshold may be a fixed value that is set based on actual needs, or a value derived from statistical calculations. For example, the error threshold of the estimated earning may be set at a fixed value of "0.2."

Further, the estimated value may be corrected by using the cost upper limit set by the client. If the difference in the cost upper limit set by the client and the cost upper limit at the previous nth day is smaller than a certain threshold, such as a threshold value "1," then the actual earning and cost at previous nth day may be used to correct the estimated earning and estimated cost respectively.

At 205, estimated value of each search keyword is added up to generate the estimated value of the entire account.

The modified estimated earning of each search keyword is added up to obtain the estimated earning of the entire account, and the modified estimated cost of each search keyword is added up to obtain the estimated cost of the entire account. The calculation method in this operation is similar to the present techniques and is not detailed herein.

At 206, interval processing to the estimated value of the entire account is performed to generate the interval estimated value.

The corrected estimated values of several search keywords may be added up and the result is converted to the interval value by using interval processing calculation method.

The interval processing to the client's entire click volume as the estimate earning is used as an example. First of all, the interval period for the click volume is defined, where the interval is different range of the click volume. For example, the click volume may be divided into 4 intervals: 0 to 10, 10 to 20, 20 to 30, and 30 and above. Secondly, the error calculation function of the expected true value and estimated volume is defined as the relative error function, a formula of which is shown below:

$$\varepsilon = \frac{|r - p|}{p}$$

In the above formula, r is the expected true value of the click volume, or r is the two endpoint values of the interval defined above. For example, in the interval 0 to 10, the values for r are 0 and 10, and p is the estimated click volume derived from the step 205.

Further, the allowable error for the different interval may be defined. For example, when the expected true value is within 0 to 10, the allowable error is defined as $\epsilon_1$; when the expected true value is within 10 to 20, the allowable error is defined as $\epsilon_2$; when the expected true value is within 20 to 30, the allowable error is defined as $\epsilon_3$; when the expected true value is greater than 30, the allowable error is defined as $\epsilon_4$. $\epsilon_1$ to $\epsilon_4$ can be in decreasing sequence.

According to the allowable error for different interval as defined above, the estimated values are processed as follows:

When $$r \in [0, 10], \frac{|r - p|}{p} \leq \varepsilon_1,$$

the following formula is derived:

$$0 \leq (1-\epsilon_1) \times p \leq r \leq (1+\epsilon_1) \times p \leq 10$$

$$0 \leq p \leq \frac{10}{(1 + \varepsilon_1)}$$

Accordingly when is derived from the above formula, the interval processing result of the expected true value is as follows:

$$(1-\epsilon_1) \times p \leq r \leq (1+\epsilon_1) \times p$$

Thus, when r is in different interval periods of the expected true value, if $$\frac{levelup_i}{1 + \varepsilon_i} \leq p \leq \frac{leveldown_{i+1}}{1 - \varepsilon_{i+1}}$$

($leveldown_i$ is a lower bound of the ith interval period and levelup is a upper bound of the ith interval period), then the interval processing result is:

$$(1-\epsilon_i) \times p \leq r \leq (1+\epsilon_i) \times p$$

Also, if $$\frac{levelup_i}{1 + \varepsilon_i} \leq p \leq \frac{leveldown_{i+1}}{1 - \varepsilon_{i+1}},$$

then the interval processing result is:

$$(1-\epsilon_i(\epsilon_i+1)) \times p \leq r \leq (1+\epsilon_i(\epsilon_i+1)) \times p$$

At 207, the interval estimated value of the entire account is returned to the client terminal where the entire account is logged in. This ends the current process flow.

As shown, the above exemplary embodiment is different from the current techniques that use simple accumulation of estimated values of search keywords to obtain the estimated value of the entire account. The above exemplary embodiment comprehensively considers the historic data and the client's set parameters and modifies the estimated value of each search keyword so that the estimated value of the entire account may satisfy the client's forecasted value. When the search engine server returns the estimated values to the client, due to the higher accuracy of the estimated values, there is no need for further processing by the client, thereby improving the client experiences. In addition, there is no need for the search engine server and the client to have multiple communications and perform repeated calculations on the estimated values, thereby saving network resources and reducing the workload of the server.

The following is an application scenario that describes the above method for returning the estimated value of the search keywords of an entire account.

In this example, a respective client's search keywords are a, b, c, the bid prices are p1, p2, p3 respectively, and the forecast period is 1 day. Then based on the estimated value forecast calculation method, each search keyword's estimated earnings is v1, v2, v3 respectively and each search keyword's estimated costs are c1, c2, c3;

After each search keyword's estimated earning and estimated cost have been modified through the ratio distribution of the estimated earning and estimated cost in several historical presentation periods, the modified estimated earnings are t_v1, t_v2, t_v3 respectively and the modified estimated costs are t_c1, t_c2, t_c3 respectively.

Based on the historical data, at a same bid price in the n time period (different values for n can be used based on the different applications, e.g., n=2, which means prior 2 days), each search keyword's earnings are r_v1, r_v2, r_v3 respectively and each search keyword's earning's estimated costs are r_c1, r_c2, r_c3 respectively.

An error threshold may be defined, such as 0.3. A fixed compensation threshold may be defined, such as 1. In addition, an absolute error calculation function fun( ) may be defined. The correction process is as follows: for the search keyword a, when fun(t_v1−r_v1)<0.1, the final forecast value is t_v1, otherwise, the final forecast value is r_v1+1. The correction process for the search keyword b or c is the same as the correction process for the search keyword a.

The corrected estimated earnings and the corrected estimated costs of the search keywords a, b, and c are added up to obtain the estimated values of the entire account. The estimated values of the entire account may be conducted by interval processing as follows:

During interval processing, it is assumed that that when the interval of the expected true value falls within 0 to 10, the allowable error is 0.5; when the interval of the expected true value falls within 10 to 20, the allowable error is 0.4; when the interval of the expected true value falls within 20 to 30, the allowable error is 0.25; when the interval of the expected true value is greater than 30, the allowable error is 0.05.

It is also assumed that the corrected estimated value is 5. Since $$0 \le p \le \frac{10}{(1+\varepsilon_1)},$$

5 is substituted into the above formula to obtain $$0 \le 5 \le \frac{10}{(1+0.5)}$$

Thus the forecasted interval of the expected true value uses $(1-\epsilon_1) \times p \le r \le (1+\epsilon_1) \times p$. 5 is substituted into the above formula to obtain $(1-0.5) \times 5 \le r \le (1+0.5) \times 5$, or the result after the interval processing is [2.5, 7.5]. Then the interval [2.5, 7.5] is returned to the client terminal where the entire account has logged in.

If it is assumed that the corrected estimated value is 15, Since $$\frac{levelup_i}{1+\varepsilon_i} \le p \le \frac{leveldown_{i+1}}{1-\varepsilon_{i+1}},$$

15 is substituted into the above formula to obtain $$\frac{20}{1+0.4} \le 15 \le \frac{20}{1-0.25}$$

Thus the forecasted interval of the expected true value uses $(1-\epsilon_i(\epsilon_i+1)) \times p \le r \le (1+\epsilon_i/(\epsilon_1+1)) \times p$. 15 is substituted into the above formula to obtain $(1-0.4(0.4+1)) \times 15 \le r \le (1+0.4(0.4+1)) \times 15$, or the result after the interval processing is [6.6, 23.4]. Then the interval [6.6, 23.4] is returned to the client terminal where the entire account has logged in.

Figure 3:
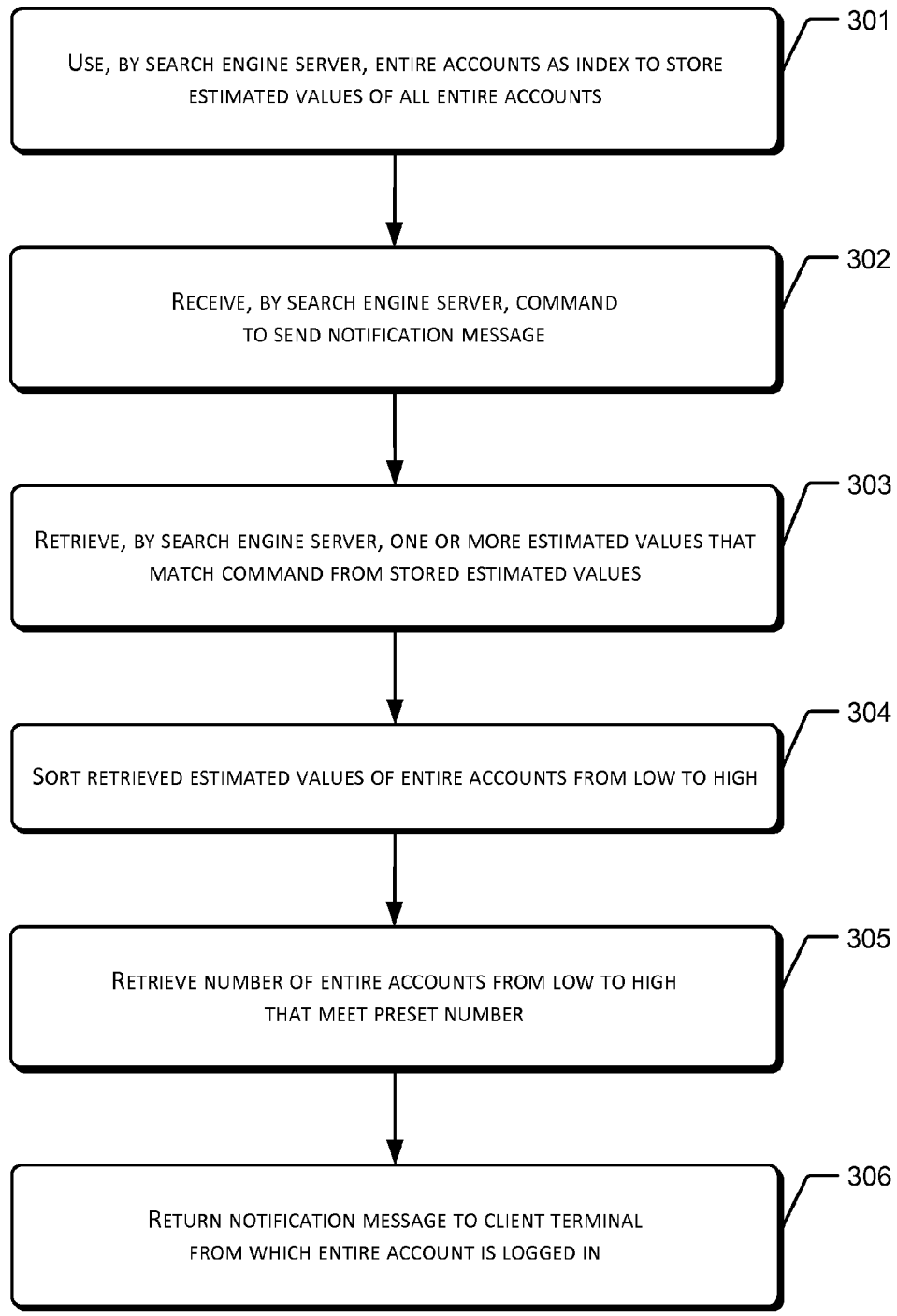
FIG. 3 illustrates an application flow diagram of an exemplary embodiment of a method for returning estimated value of search keywords of an entire account in accordance with the present disclosure.

FIG. 3 is an application flow diagram for the exemplary embodiments of the method for returning the estimated values of search keywords of the entire account. The estimated values used in this process may be retrieved through the process described in the first and second exemplary embodiments.

At 301, the search engine server uses the entire accounts as an index to store estimated values of all entire accounts. In this example, the search engine server obtains multiple entire accounts.

The previous examples provide detailed process for generating the estimated values of each entire account. The search engine server may store the generated estimated values of each entire account into an estimated value table in the database. The estimated value table uses the entire account as the index, and records the entire account and its corresponding estimated values in each item. Further, the estimated value table may also record the generation time of the estimated values.

At 302, the search engine server receives a command to send a notification message.

Since the search engine server stores the historical estimated value of several entire accounts, within a certain time period, it may send notification messages to the client based on the statistics of these historical estimated values. For example, the search engine server may send a corresponding reminder to a client whose estimated values are lower.

The command to send notification message may include a time period for statistics, a number of notification messages that need to be sent, etc.

At 303, the search engine server retrieves one or more estimated values that match the command from the stored estimated values.

The search engine server may, based on the requested time period, retrieve from the estimated value table all the estimated values that satisfy the time period requirement.

At 304, the search engine server sorts the retrieved estimated values of the entire accounts from low to high.

At 305, the search engine server, from the sorted estimated values, retrieves a number of entire accounts according to a preset sorting order, such as from low to high. The operation of retrieving includes a selecting operation. The number of entire accounts selected may be a preset number.

At 306, the search engine server returns the notification message to one or more client terminals from which the selected entire account is logged in. This ends the current operation.

In this exemplary embodiment, from the sorted estimated values, the search engine server obtains a number of entire accounts whose estimated values are lower. These entire accounts with lower estimated values may have errors in the selection of search keyword, or may not comply with the preset cost upper limit of the entire accounts. Thus, the search engine server may specifically select the client terminals where these entire accounts are logged in to send the notification messages as reminders to these entire accounts. Alternatively, the sort order can be from high to low, which can still achieve the objectives of this exemplary embodiment. The present disclosure does not make restrictions.

As shown, due to the higher accuracy of the generated estimated values of the entire accounts in the exemplary embodiment, when the notification messages are sent to the entire accounts based on their estimated values, there is no need to send the notification messages to all of the clients. In contrast, the search engine server may specifically send the notification messages to selected entire accounts, thereby saving data transmission of the notification messages between the server and the client terminal in the network, reducing the workload of the search engine server, and saving the network transmission resources.

Corresponding to the exemplary embodiments relating to methods for returning estimated values of search keywords of the entire account, the present disclosure also provides exemplary embodiments relating to the search engine server.

Figure 4:
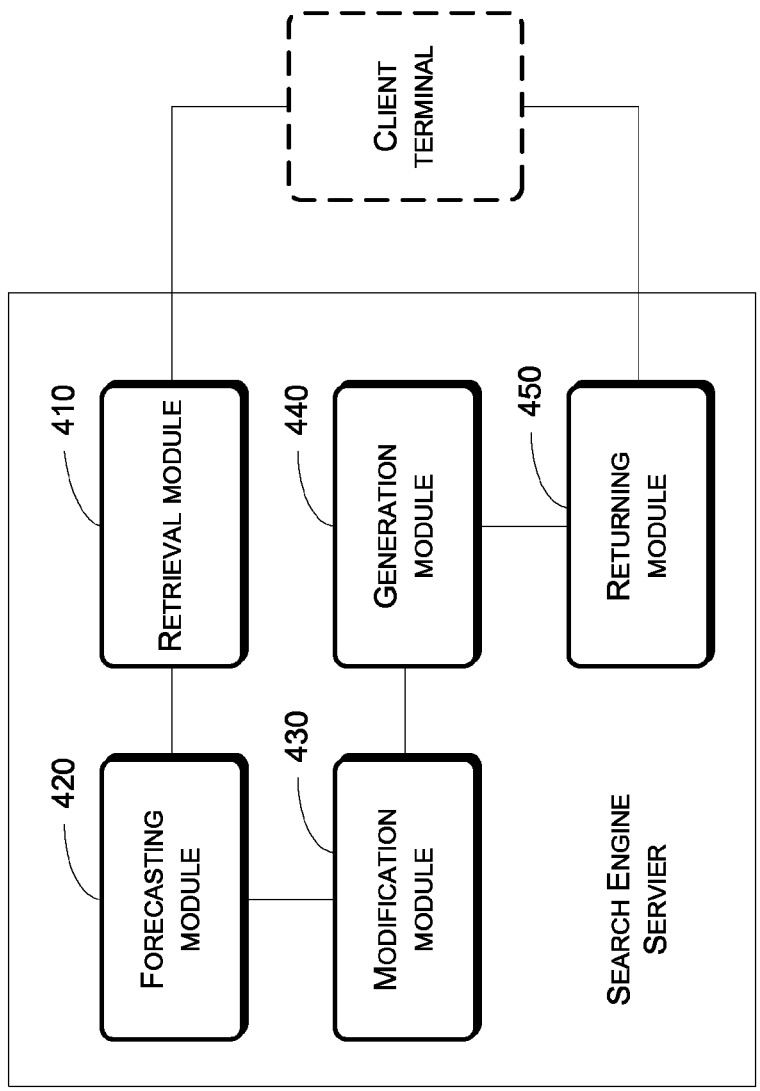
FIG. 4 illustrates a block diagram of a first exemplary embodiment of a search engine server in accordance with the present disclosure.

FIG. 4 illustrates a block diagram of a first exemplary embodiment of the search engine server in accordance with the present disclosure.

The search engine server may include a retrieval module 410, a forecasting module 420, a modification module 430, a generation module 440, and a returning module 450.

The retrieval module 410 retrieves, within the entire account, one or more selected search keywords, respective forecast periods, and each selected search keyword's parameter settings.

The forecasting module 420 forecasts the estimated value of each search keyword in the forecast period.

The modification module 430, based on the stored historical data and parameter settings of each search keyword, modifies the estimated value of the respective search keyword to obtain the modified estimated value.

The generation module 440 adds up the modified estimated value of each search keyword to generate the estimated value of the entire account.

The returning module 450 returns the estimated value of the entire account to the client terminal where the entire account has logged in.

Figure 5:
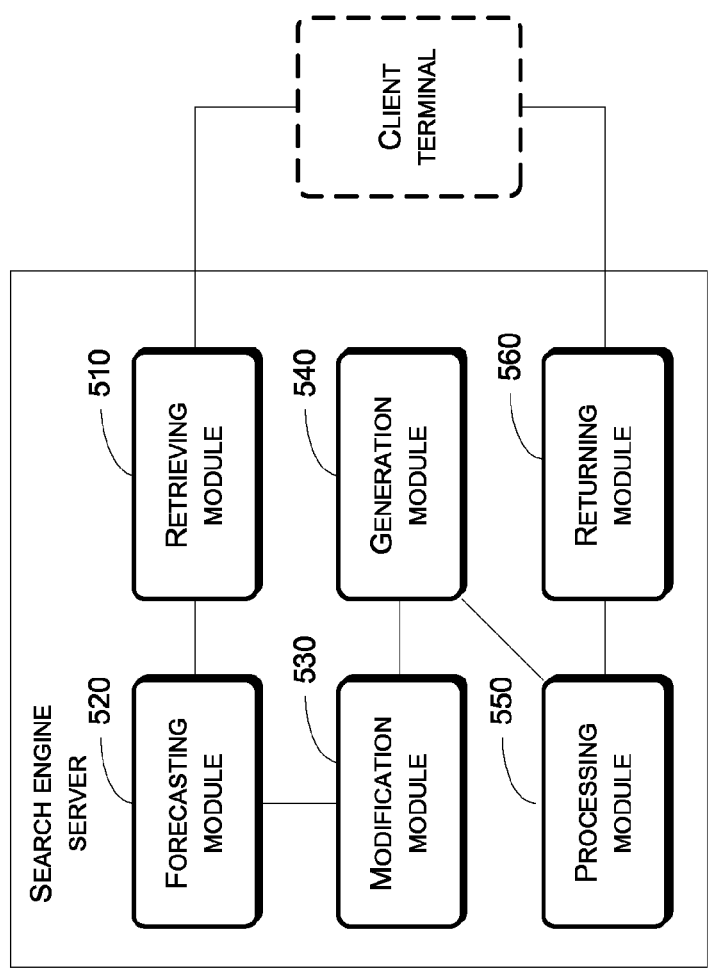
FIG. 5 illustrates a block diagram of a second exemplary embodiment of a search engine server in accordance with the present disclosure.

FIG. 5 illustrates a block diagram of a second exemplary embodiment of the search engine server in accordance with the present disclosure.

The search engine server may include a retrieval module 510, a forecasting module 520, a modification module 530, a generation module 540, a processing module 550, and a returning module 560.

The retrieval module 510 retrieves, within the entire account, one or more selected search keywords, respective forecast periods, and each selected search keyword's parameter settings. The parameter setting includes a bid price of each search keyword, and a presentation time of each search keyword in the search page.

The forecasting module 520 forecasts estimated value of each search keyword in the forecast period. The estimated value may include estimated earning and estimated cost.

The modification module 530, based on the stored historical data and parameter settings of each search keyword, modifies the estimated value of the respective search keyword to obtain the modified estimated values.

The generation module 540 adds up the modified estimated value of each search keyword to generate the estimated value of the entire account.

The processing module 550 performs interval processing to the estimated value of the entire account to generate the interval estimated value.

The returning module 560 returns the interval estimated value of the entire account to the client terminal where the entire account has logged in.

Specifically, the forecasting module 520 may include one or more of the following modules (not shown in FIG. 5):

a parameter retrieval module that retrieves the historical presentation volume of the search keyword, as well as the presentation ratio of the search keyword at the different presentation locations;

a times calculation module that calculates the presentation times of the search keyword at the different presentation locations based on the historical presentation volume and presentation ratio of the search keyword;

an estimated value calculation module that multiplies the search keyword's one-time presentation earning and one-time presentation cost value with its presentation times at the different presentation locations to obtain the search keyword's estimated earning and estimated cost at the different presentation locations; and an estimated value accumulation module that respectively adds up the estimated earnings and estimated costs of the search keyword at the different presentation locations to obtain the estimated value in the forecast period.

Specifically, the modification module 530 may include the following modules (not shown in FIG. 5):

a ratio retrieval module that obtains the distribution ratio of the historical estimated earnings and the distribution ratio of the historical estimated costs of the search keyword in the several presentation times, based on the historical statistics data;

an estimated value sum module that respectively adds up the estimated earnings and estimated costs in the several presentation time periods, based on the distribution ratio of the historical estimated earnings, the distribution ratio of the historical estimated costs, and the estimated earning and estimated cost of the search keyword;

a historical data correction module that, based on the earning and cost of the respective search word in the historical periods that are same or similar in length to the forecast period, modifies the estimated earning and estimated cost of the respective search word in the one or more presentation time periods respectively.

Figure 6:
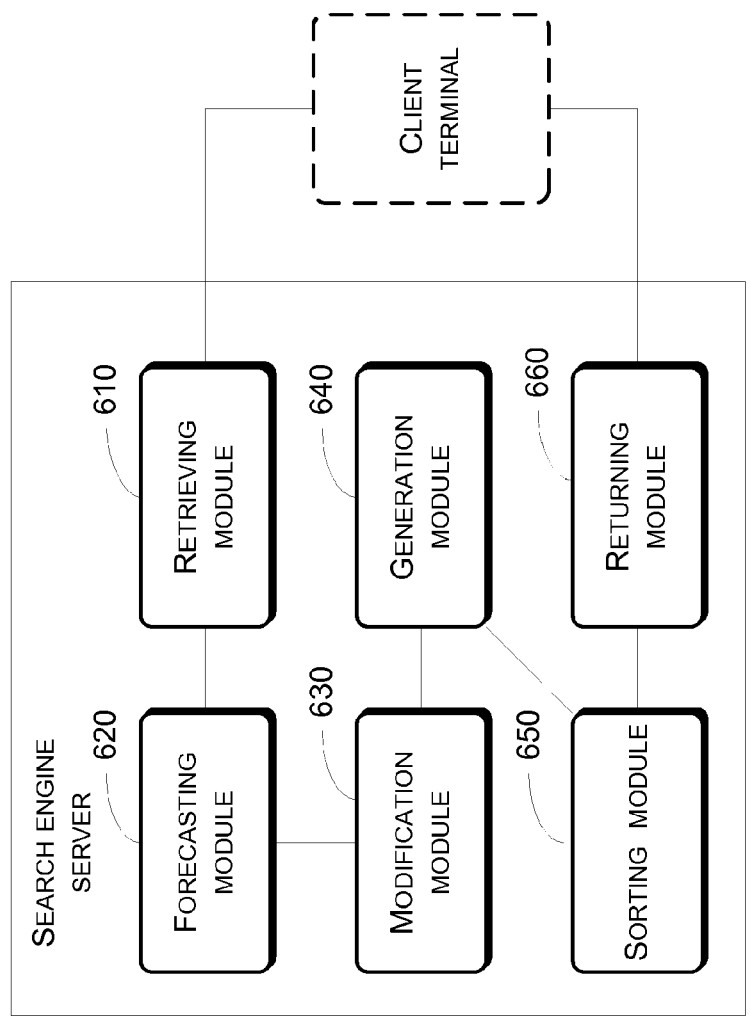
FIG. 6 illustrates a block diagram of a third exemplary embodiment of a search engine server in accordance with the present disclosure.

FIG. 6 illustrates a block diagram of a third exemplary embodiment of a search engine server in accordance with the present disclosure.

The search engine server may include a retrieval module 610, a forecasting module 620, a modification module 630, a generation module 640, a returning module 650, and a sorting module 660.

The retrieval module 610 retrieves, within the entire account, one or more selected search keywords, respective forecast periods, and each selected search keyword's parameter settings.

The forecasting module 620 forecasts the estimated value of each search keyword in the forecast period.

The modification module 630, based on the stored historical data and parameter settings of each search keyword, modifies the estimated value of the respective search keyword to obtain the modified estimated value.

The generation module 640 adds up the modified estimated value of each search keyword to generate the estimated value of the entire account.

The returning module 650 returns the estimated value of the entire account to the client terminal where the entire account has logged in.

The sorting module 660 sorts the estimated values of multiple entire accounts from low to high, and, according to an order such as from low to high estimated values, retrieves a number of entire accounts that meet a preset number.

Figure 7:
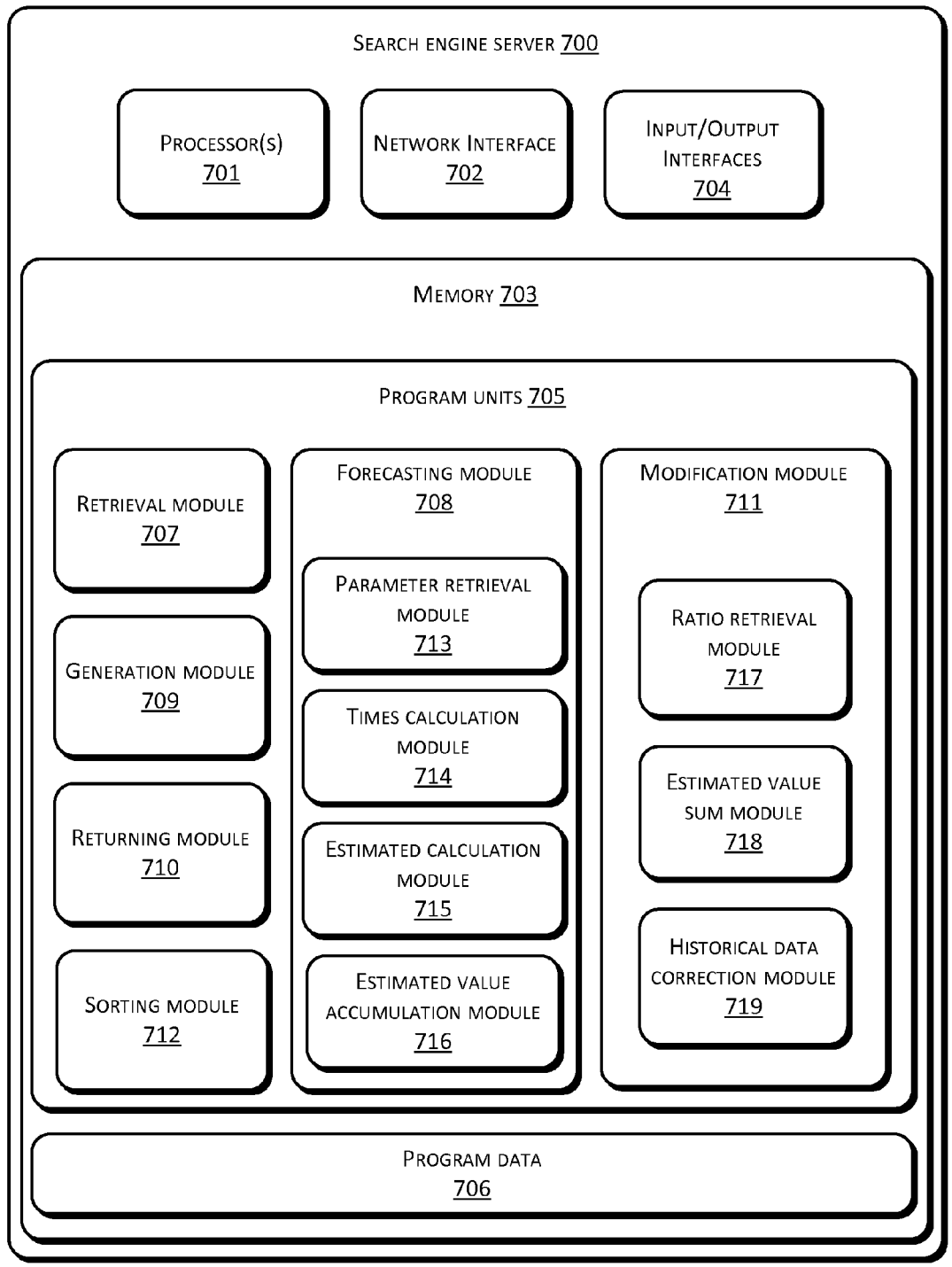
FIG. 7 illustrates a block diagram of another exemplary computing system.

For another example, FIG. 7 illustrates an exemplary system 700, such as the search engine server as described above, in more detail. In one embodiment, the system 700 can include, but is not limited to, one or more processors 701, a network interface 702, memory 703, and an input/output interface 704.

The memory 703 may include computer-readable media in the form of volatile memory, such as random-access memory (RAM) and/or non-volatile memory, such as read only memory (ROM) or flash RAM. The memory 703 is an example of computer-readable media.

Computer-readable media includes volatile and non-volatile, removable and non-removable media implemented in any method or technology for storage of information such as computer readable instructions, data structures, program modules, or other data. Examples of computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media does not include transitory media such as modulated data signals and carrier waves.

The memory 703 may include program units 705 and program data 706. In one embodiment, the program units 705 may include the retrieval module 707, the forecasting module 708, the generation module 709, the returning module 710, the modification module 711, for example.

Additionally, in some embodiments, the program units 705 may further include the sorting module 712. In some embodiments, the forecasting module 708 may further include the parameter retrieval module 713, the times calculation module 714, the estimated value calculation module 715, and the estimated value accumulation module 716. In some embodiments, the modification module 711 may further include the ratio retrieval module 717, the estimated value sum module 718, and the historical data correction module 719. The functions of each of the foregoing modules may be the same as those described for the corresponding modules in the previous embodiments.

According to the description of the above exemplary embodiments, the search engine server, as disclosed in the exemplary embodiments of the present disclosure, obtains, from within the entire account, multiple selected search keywords and their respective forecast periods, and parameter settings. The search engine server then estimates an estimated value of each search keyword in the respective forecast period. Based on the stored historical data and parameter settings of each search keyword, the search engine server modifies the estimated value of the respective search keyword to obtain a modified estimated value, and adds the modified estimated value of each search keyword to generate an estimated value of the entire account. The search engine server then returns the estimated value of the entire account to a client terminal from which the entire account is logged in. The methods in the exemplary embodiments of the present disclosure are different from existing techniques, which simply accumulate the estimated values of the search keywords in order to obtain the entire account's estimated value. The exemplary embodiments of the present disclosure, by taking into consideration the historical data and the client's parameter settings, modify each search keyword's estimated value so that the estimated value of the entire account satisfies the expected value of the client. When the search engine server returns the estimated value to the client, due to the higher accuracy of this estimated value, there is no need for the client to further change or modify the data, thereby increasing the client experience; and there is no need for the multiple communications and repeated calculations of the estimated value between the search engine server and the client, thereby saving network resources and the workload of the server.

From the exemplary embodiments described above, one of ordinary skill in the art can clearly understand that the disclosed method and system may be implemented using software and universal hardware platform. Based on this understanding, the technical scheme of the present disclosure, or portions contributing to existing technologies, may be implemented in the form of software products which are stored in a storage media such as ROM/RAM, hard drive and optical disk. The software includes instructions for a computing device (e.g., personal computer, server or networked device) to execute the method described in the exemplary embodiments of the present disclosure.

The various exemplary embodiments are progressively described in the present disclosure. Same or similar portions of the exemplary embodiments can be mutually referenced. Each exemplary embodiment has a different focus than other exemplary embodiments. In particular, the exemplary system embodiment has been described in a relatively simple manner because of its fundamental correspondence with the exemplary method. Details thereof can be referred to related portions of the exemplary method. Descriptions of the above exemplary system are meant for illustrative purpose only. Units or modules described as separate components therein may or may not be physically separated. Components illustrated in terms of units may or may not be physical units, e.g., may be located in one place or may be distributed among multiple network units. Depending on the actual needs, the goal of the exemplary embodiments may be achieved by selecting parts or all of the modules. One of ordinary skill in the art can understand and implement the disclosed system without any innovative effect.

The disclosed method and system may be used in an environment or in a configuration of universal or specialized computer systems. Examples include a personal computer, a server computer, a handheld device or a portable device, a tablet device, a multi-processor system, a microprocessor-based system, a set-up box, a programmable customer electronic device, a network PC, a small-scale computer, a large-scale computer, and a distributed computing environment including any system or device above.

The present disclosure may be described within a general context of computer-executable instructions executed by a computer, such as a program module. Generally, a program module includes routines, programs, objects, modules, data structure, computer-executable instructions and etc., for executing specific tasks or implementing specific abstract data types. The disclosed method and server may also be implemented in a distributed computing environment. In the distributed computing environment, a task is executed by remote processing devices which are connected through a communication network. In distributed computing environment, the program module may be located in storage media (which include storage devices) of local and/or remote computers.

Above are exemplary embodiments of the present disclosure. However, the present disclosure is not limited hereto. It is appreciated that one of ordinary skill in the art can alter or modify the present disclosure in many different ways without departing from the spirit and the scope of this disclosure. These modifications and variations should therefore be considered to fall within the scope of the claims of the present disclosure and their equivalents.

What is claimed is:

1. A method of returning an estimated account value of search keywords, performed by one or more processors configured with computer-executable instructions, the method comprising:

obtaining one or more search keywords associated with an account, a respective forecast period and a respective bid price corresponding to each individual search keyword of the one or more search keywords;

providing an estimated value corresponding to each individual search keyword, the respective forecast period, and the respective bid price;

calculating the estimated account value based on a sum of the estimated values corresponding to each individual search keyword of the one or more search keywords;

defining a plurality of value intervals associated with the estimated account value;

assigning a respective allowable error to each of the value intervals; and generating an interval estimated value between a first value equaling the estimated account value multiplied by $(1-\epsilon_i(\epsilon_i+1))$ and a second value equaling the estimated account value multiplied by $(1+\epsilon_i(\epsilon_i+1))$ when the estimated account value falls between a third value equaling an upper bound of the value interval that corresponds to the estimated account value divided by $(1+\epsilon_i)$ and a fourth value equaling a lower bound of a next higher value interval divided by $(1-\epsilon_{i+1})$, wherein $\epsilon_i$ is a first respective allowable error assigned to the value interval that corresponds to the estimated account value and $\epsilon_{i+1}$ is a second respective allowable relative error assigned to the next higher value interval.

2. A method as recited in claim 1, further comprising:
selecting a plurality of historical presentation time periods, each of which is similar in length to the respective forecast period, a historical period comprising the plurality of historical presentation time periods;
generating a series of ratios, each of which corresponds to a proportion of a historical value corresponding to a respective historical presentation time period of the plurality of historical presentation time periods with respect to the historical period; and
multiplying the estimated value corresponding to each individual search keyword by a sum of the series of ratios to generate a modified estimated value corresponding to each individual search keyword.

3. A method as recited in claim 2, wherein the providing the estimated value of each individual search keyword, the respective forecast period and the respective bid price comprises:
obtaining a historical presentation volume of each individual search keyword and a presentation ratio of each individual search keyword at different presentation locations;
determining a number of presentations of each individual search keyword at the different presentation locations based on the historical presentation volume and the presentation ratio of each individual search keyword;
obtaining an estimated earning and an estimated cost of each individual search keyword at an individual location of the different presentation locations; and
calculating the estimated value of each individual search keyword in the respective forecast period at the different presentation locations based on a sum of estimated earnings and estimated costs of each individual search keyword at the different presentation locations.

4. A method as recited in claim 1, further comprising returning the interval estimated value.

5. A method as recited in claim 1, further comprising:
obtaining multiple entire accounts;
sorting estimated values of the multiple entire accounts;
selecting a preset number of entire accounts to a sorting order from low to high from the sorted estimated values; and
returning a notification message to one or more client terminals from which the selected entire accounts are logged in.

6. A search engine server comprising:
a memory to maintain executable program instructions; and
a processor that retrieves one or more search keywords associated with an account, a respective forecast period, and a respective bid price corresponding to each individual search keyword of the one or more search keywords; provides an estimated value corresponding to each individual search keyword, the respective forecast period, and the respective bid price; determines an estimation error based on the estimated value and an actual value corresponding to a historical presentation time period that is similar in length to the respective forecast period; substitutes the actual value plus a compensation threshold for the estimated value when the estimation error is greater than a predetermined threshold; calculates an estimated account value based on a sum of the estimated values corresponding to each individual search keyword of the multiple search keywords; defines a plurality of value intervals associated with the estimated account value, assigns a respective allowable error to each of the value intervals, and generates an interval estimated value between a first value equaling the estimated account value multiplied by $(1-\epsilon_i(\epsilon_i+1))$ and a second value equaling the estimated account value multiplied by $(1+\epsilon_i(\epsilon_i+1))$ when the estimated account value falls between a third value equaling an upper bound of the value interval that corresponds to the estimated account value divided by $(1+\epsilon_i)$ and a fourth value equaling a lower bound of a next higher value interval divided by $(1-\epsilon_{i+1})$, wherein $\epsilon_i$ is a first respective allowable error assigned to the value interval that corresponds to the estimated account value and $\epsilon_{i+1}$ is a second respective allowable relative error assigned to the next higher value interval.

7. A search engine server as recited in claim 6, wherein the processor further selects a plurality of historical presentation time periods, each of which is similar in length to the respective forecast period, a historical period comprising the plurality of historical presentation time periods, wherein the processor generates a series of ratios, each of which corresponds to a proportion of a historical value corresponding to a respective historical presentation time period of the plurality of historical presentation time periods with respect to the historical period, and wherein the processor multiplies the estimated value corresponding to each individual search keyword by a sum of the series of ratios to generate a modified estimated value corresponding to each individual search keyword.

8. A search engine server as recited in claim 7, wherein the processor further retrieves a historical presentation volume of each individual search keyword and a presentation ratio of each individual search keyword at different presentation locations, calculates a number of presentation times of each individual search keyword at the different presentation locations based on the historical presentation volume and the presentation ratio of each individual search keyword, obtains an estimated earning and an estimated cost of each individual search keyword at an individual location of the different presentation locations, and calculates the estimated value of each individual search keyword in the individual forecast period at the different presentation locations based on a sum of estimated earnings and estimated costs of each individual search keyword at the different presentation locations.

9. A search engine server as recited in claim 6, wherein the processor further returns the estimated account value.

10. A search engine server as recited in claim 6, wherein the processor sorts estimated values corresponding to a plurality of accounts and, from the sorted estimated values, retrieves a number of accounts to a sorting order that meet a preset number,
wherein the returning module returns a notification message to a client terminal from which the account is logged in.

11. One or more computer-readable media comprising computer-readable instructions executable by one or more processors that, when executed by the one or more processors, cause the one or more processors to perform operations comprising:
obtaining one or more search keywords associated with an account, a respective forecast period and a respective bid price corresponding to each individual search keyword of the one or more search keywords;

calculating an estimated value corresponding to each individual search keyword the respective forecast period, and the respective bid price;

calculating an estimated account value based on a sum of the estimated values corresponding to each individual search keyword of the one or more search keywords;

defining a plurality of value intervals associated with the estimated account value;

assigning a respective allowable error to each of the value intervals; and generating an interval estimated value between a first value equaling the estimated account value multiplied by $(1-\epsilon_i(\epsilon_i+1))$ and a second value equaling the estimated account value multiplied by $(1+\epsilon_i(\epsilon_i+1))$ when the estimated account value falls between a third value equaling an upper bound of the value interval that corresponds to the estimated account value divided by $(1+\epsilon_i)$ and a fourth value equaling a lower bound of a next higher value interval divided by $(1-\epsilon_{i+1})$, wherein $\epsilon_i$ is a first respective allowable error assigned to the value interval that corresponds to the estimated account value and $\epsilon_{i+1}$ is a second respective allowable relative error assigned to the next higher value interval.

12. The one or more computer-readable media as recited in claim 11, wherein the operations further comprise:
obtaining multiple entire accounts; and
sorting estimated values of the multiple entire accounts.

13. The one or more computer-readable media as recited in claim 12, wherein the operations further comprise:
selecting a preset number of entire accounts according to a sorting order from the sorted estimated values; and
returning a notification message to one or more client terminals from which the preset number of entire accounts are logged in.

14. The one or more computer-readable media as recited in claim 11, wherein the operations further comprise:
obtaining a historical presentation volume of each individual search keyword and a presentation ratio of each individual search keyword at different presentation locations; and
determining a number of presentations of each individual search keyword at the different presentation locations based on the historical presentation volume and the presentation ratio of each individual search keyword.

15. The one or more computer-readable media as recited in claim 11, wherein the operations further comprise:
selecting a plurality of historical presentation time periods, each of which is similar in length to the respective forecast period, a historical period comprising the plurality of historical presentation time periods;
generating a series of ratios, each of which corresponds to a proportion of a historical value corresponding to a respective historical presentation time period of the plurality of historical presentation time periods with respect to the historical period; and
multiplying the estimated value corresponding to each individual search keyword by a sum of the series of ratios to generate a modified estimated value corresponding to each individual search keyword.

16. The one or more computer-readable media as recited in claim 11, wherein the operations further comprise returning the interval estimated value.

* * * * *